(12) United States Patent
Hurlin et al.

(10) Patent No.: US 8,845,287 B2
(45) Date of Patent: Sep. 30, 2014

(54) TURBOJET ENGINE NACELLE

(71) Applicants: Aircelle, Gonfreville l'Orcher (FR); SNECMA, Paris (FR)

(72) Inventors: Hervé Hurlin, Igny (FR); Nicolas Dezeustre, Le Havre (FR); Olivier Kerbler, Antony (FR); François Gallet, Paris (FR); Bertrand Desjoyeaux, Sainte Adresse (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/731,150

(22) Filed: Dec. 31, 2012

(65) Prior Publication Data

US 2013/0121814 A1    May 16, 2013

Related U.S. Application Data

(63) Continuation of application No. PCT/FR2011/051387, filed on Jun. 17, 2011.

(30) Foreign Application Priority Data

Jun. 29, 2010    (FR) .................................... 10 55182

(51) Int. Cl.
*F01D 25/28* (2006.01)
*B64D 29/08* (2006.01)
*F01D 25/24* (2006.01)
*B64D 29/06* (2006.01)

(52) U.S. Cl.
CPC ............... *F01D 25/24* (2013.01); *B64D 29/08* (2013.01); *B64D 29/06* (2013.01)
USPC ..................... 415/213.1; 415/214.1; 415/220; 415/201; 415/126

(58) Field of Classification Search
USPC ................. 415/213, 214.1, 220, 201; 244/54, 244/129.4, 129.5
See application file for complete search history.

(56) References Cited

U.S. PATENT DOCUMENTS

| 4,132,069 A | 1/1979 | Adamson et al. |
| 6,123,170 A * | 9/2000 | Porte et al. .................... 181/214 |
| 6,220,546 B1 * | 4/2001 | Klamka et al. ............. 244/129.4 |
| 6,334,730 B1 * | 1/2002 | Porte .............................. 403/104 |
| 7,789,347 B2 * | 9/2010 | Oberle et al. .............. 244/129.4 |
| 8,091,832 B2 * | 1/2012 | Marche ...................... 244/129.5 |
| 2006/0145001 A1 | 7/2006 | Smith |
| 2011/0138574 A1 * | 6/2011 | Bogue et al. .................... 16/221 |

FOREIGN PATENT DOCUMENTS

| EP | 2163748 A1 | 3/2010 |
| FR | 2771330 A1 | 5/1999 |
| GB | 2274490 A | 7/1994 |
| WO | 96/11843 A1 | 4/1996 |

OTHER PUBLICATIONS

PCT/FR2011/051387 International Search Report.

* cited by examiner

*Primary Examiner* — Ninh H Nguyen
(74) *Attorney, Agent, or Firm* — Brinks Gilson & Lione

(57) ABSTRACT

A nacelle for a turbojet engine is provided that includes an air intake upstream from the turbojet engine, a middle section intended to surround a fan of the turbojet engine and its case, and a downstream section. The middle section is made from at least one aerostructure capable of ensuring external aerodynamic continuity of the nacelle, and the aerostructure is rigidly bound, so as to be able to be taken apart, to at least one surrounding fixed structure.

12 Claims, 2 Drawing Sheets

TURBOJET ENGINE NACELLE

CROSS-REFERENCE TO RELATED APPLICATIONS

This application is a continuation of International Application No. PCT/FR2011/051387 filed on Jun. 17, 2011, which claims the benefit of FR 10/55182, filed on Jun. 29, 2010. The disclosures of the above applications are incorporated herein by reference.

FIELD

The present disclosure relates to a turbojet engine nacelle comprising a middle section intended to surround a fan of the turbojet engine.

BACKGROUND

The statements in this section merely provide background information related to the present disclosure and may not constitute prior art.

An airplane is driven by several turbojet engines each housed in a nacelle also harboring an assembly of ancillary actuation devices related to its operation and ensuring various functions when the turbojet engine is operating or at a standstill, such as for example a thrust reversal system.

More specifically a nacelle generally has a structure comprising an air intake upstream from the engine, a middle section intended to surround a fan of the turbojet engine, and a downstream section intended to surround the combustion chamber of the turbojet engine and harboring thrust reversal means.

The fan of the turbojet engine essentially consists of a rotary shaft bearing a plurality of blades. At their radial end, the blades are circumferentially surrounded by a case.

In order to be able to access the case of the fans, the middle section generally comprises at least two cowlings capable of radially opening by pivoting around an upper longitudinal hinge line located in proximity to an axis of the pylon to which the nacelle has to be attached.

In the closing position, these cowlings are locked on a fixed structure or with each other by a set of locks, along a lower longitudinal locking line in the case of a driving installation under a wing.

The presence of these cowlings in the middle section has an impact on the load spreading paths between the structures of the nacelle and on the transmission paths of the latter towards the pylon since the main force transmission lines are localized along the hinge line and the locking line.

Such a configuration is not optimum in the case of circumferential forces which have to be contained, notably for example in the case of an incident of the blade loss type.

More specifically, in the case of a blade loss, the air intake is subject to significant displacements associated with significant loads. Conventionally, these loads are spread out by the fan case via a fan case/air intake connecting bracket.

Complementarily, it may also be noted that an opening mode by pivoting may have difficulties when the nacelle is close to the structure of the airplane, and notably of the wing. Indeed, during maintenance interventions on the turbojet engine, the half-portions and cowlings of the nacelle which are located in proximity to the wing cannot be opened beyond a certain angle, the latter being blocked by the wing or more generally by the structure of the airplane.

Further, radial opening of the cowlings requires the presence of powerful opening actuation cylinders inside the nacelle, these actuators having to be able to support the weight of the cowlings as well as the forces due to gusts of wind on the ground or half-portions as well as of connecting rods allowing these cowlings and half portions to be secured in the open position. These elements represent a significant weight and occupation space.

SUMMARY

The present disclosure relates to a nacelle for a turbojet engine, comprising an air intake upstream from the turbojet engine, a middle section intended to surround a fan of the turbojet engine and its case, and an upstream section, the middle section being made from at least one aerostructure able to ensure external aerodynamic continuity of the nacelle, characterized in that said aerostructure is rigidly bound, so as to be able to be taken apart, to at least one surrounding stationary structure.

Thus, by replacing the pivoting cowls by fixed aerostructures which may be disassembled, the latter may participate in the overall spreading of forces over the whole of the middle section. The other areas for transmitting forces may then be lightened.

Moreover, it will be noted that such an adaptation of the middle section requires few pieces of equipment and no modification at the fan piece of equipment.

Advantageously, the aerostructure comprises one or more hatches allowing access to the inside of the nacelle located in proximity to an upper so-called twelve o'clock and/or lower so-called six o'clock and/or substantially middle area. The hatches thus give the possibility of keeping access to the essential internal components. Of course, in the case of a significant maintenance operation, the aerostructures will be taken apart.

In one form, the nacelle comprises one or optionally two aerostructures, notably substantially cylindrical or hemicylindrical depending on their number, positioned on either side of a substantially longitudinal access of the nacelle.

According to several other additional features:
  the aerostructure is rigidly bound, so as to be able to be taken apart, to a pylon or an interface for connecting the nacelle to a pylon,
  the aerostructure is rigidly bound, so as to be able to be taken apart, to a lower longitudinal beam,
  the aerostructure is bound to another aerostructure, notably in the lower portion.

Advantageously, the downstream section is equipped with a thrust reversal device.

In another form, the aerostructure is bound to a corresponding wall of the air intake.

Another aspect of the present disclosure is also to propose a middle section, the aerostructures of which are bound to the upstream air intake section so as to transmit few forces to this aerostructure in the case of a blade loss while being capable of supporting the forces from the other loading cases.

To do this, according to a first form, the aerostructure is bound to the air intake wall by means of rivets or screws and mounted with play between both structures.

Thus, both structures may slide relatively to each other in the case of a significant load. The tension for installing the attachments will be limited in accordance with this goal.

Alternatively or complementarily, the interface between the aerostructure and the air intake has at least one local buckling area capable of withstanding normal loads in flight but buckling in the case of strong loads, notably those due to a blade loss.

Advantageously, the buckling area is associated with at least one stiffener, and more particularly two stiffeners surrounding the buckling area.

Of course, the integrity of the structure will be improved even in the case of partial buckling of the latter.

Alternatively or complementarily, the aerostructure is bound to the air intake external wall via a flexible connection capable of damping the force transmissions so as to limit transmission of significant loads.

Still alternatively or complementarily, the connection between the aerostructure and the external air intake wall is carried out via a fan case, by means of one or more stiffeners, these stiffeners although close, are not directly bound to each other.

Thus, by means of such a decoupling, the forces will be spread by the fan case and the majority of the forces will not be transmitted to the aerostructure.

Further areas of applicability will become apparent from the description provided herein. It should be understood that the description and specific examples are intended for purposes of illustration only and are not intended to limit the scope of the present disclosure.

DRAWINGS

Other features and advantages of the present invention will appear in light of the following description, and upon examining the appended figures, in which.

Figure 1:
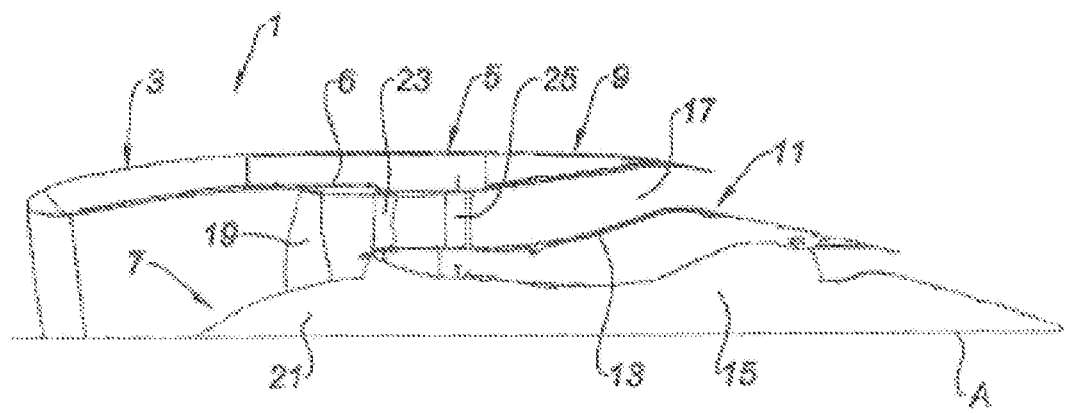
FIG. 1 is a schematic longitudinal sectional illustration of a half-nacelle of a turbojet engine.

In all of these figures, identical or similar references designate identical or similar members or sets of members.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As illustrated in FIG. 1, a nacelle 1 for a dual flow turbojet engine conventionally comprises an external structure including an upstream section 3 forming an air intake, a middle section 5, an internal wall of which is formed by a case 6 of a fan 7 of the turbojet engine, and a downstream section 9 which may incorporate thrust reversal means.

This nacelle 1 moreover includes an internal structure 11 comprising a fairing 13 of the turbojet engine 15.

The external structure of the nacelle 1 defines, with the internal structure 11, an annular air vein 17, often designated by <<cold air vein>> as opposed to the hot air generated by the engine 15.

The fan 7 essentially consists in a propeller including a plurality of blades 19, mounted so as to rotate on a fixed hub 21 which may be connected to the fan case 6 through a plurality of fixed arms 25.

Upstream from these fixed arms, are found blades for rectifying flows 23 giving the possibility of rectifying the cold air flow generated by the fan 7.

Figure 2:
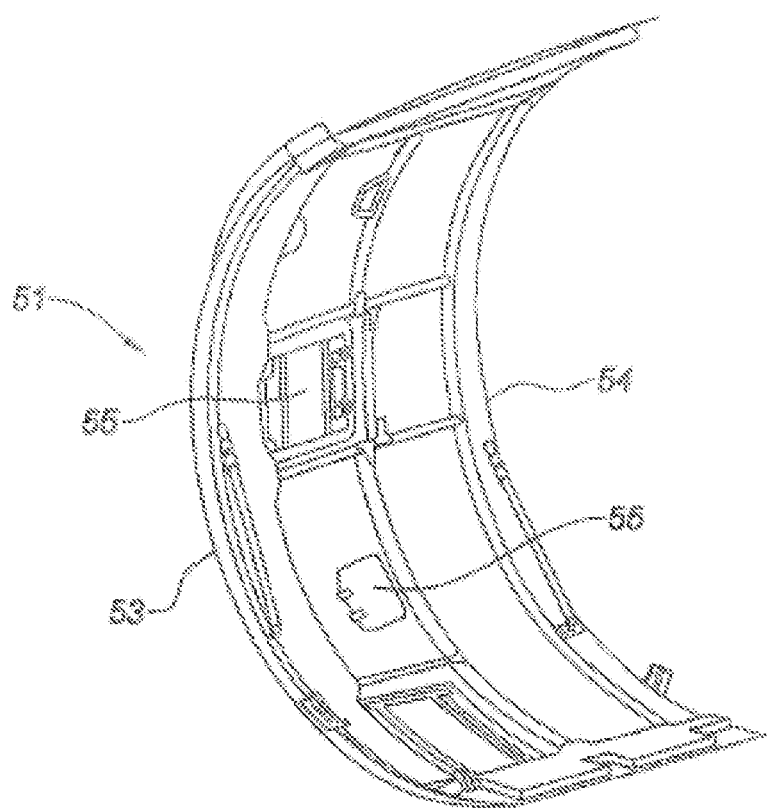
FIG. 2 is a schematic illustration of an aerostructure with which the middle section is equipped according to the present disclosure.

According to the present disclosure and in order to overcome the problems mentioned earlier, the middle section has an external wall made from at least one aerostructure 51 as illustrated in FIG. 2, rigidly mounted between the upstream section 3 and the downstream section 9 but so as to be able to be taken apart, in order to form a fixed cowl, removable in the case of a significant maintenance operation, but which cannot be opened by pivoting unlike the prior art.

More specifically, the described embodiment relates to a middle section 5 made from one or several aerostructures 51 substantially re-forming the outer shape of the nacelle, positioned around a substantially longitudinal access of the nacelle 1. As an example, in the description hereafter, two aerostructures are provided.

Each aerostructure 51 is bound, is attached in the upper portion to a pylon or to a pylon interface or further to an upper longitudinal beam, for example by means of attachments (screws or rivets) on the one hand and in the lower portion, to a lower longitudinal beam and/or to a lower edge of the second aerostructure 51 by means of attachments (screws or rivets), on the other hand.

At an upstream side 53, the aerostructure 51 is rigidly bound to an external wall of the air intake section 3 so as to ensure outer aerodynamic continuity of the nacelle.

In the same way, at a downstream side 54, the aerostructure is rigidly bound to an external wall of the downstream section 9.

The attachment means are not illustrated and particular examples are detailed in FIGS. 3 to 6.

According to a complementary aspect of the present disclosure, the aerostructures 51 comprise one or several hatches 55 for access to the inside of the nacelle. The locations and dimensions of these hatches will be determined depending on the members which an operator would like to access without having to completely take the aerostructure 51 apart.

Advantageously hatches 55 in proximity to an upper so-called twelve o'clock and/or lower so-called six o'clock and/or a substantially middle area, may be provided.

Figure 3:
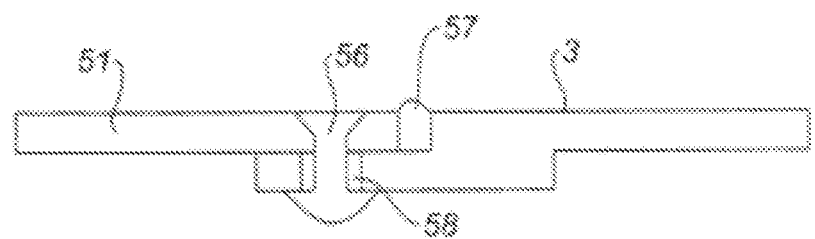
FIGS. 3 to 6 show several forms of a mechanical connection between the aerostructure of FIG. 2 and the air intake section of the turbojet engine nacelle according to the present disclosure.

According to a first form, schematically illustrated in FIG. 3, the aerostructure 51 is bound to the wall of the air intake section 3 by means of a plurality of rivets or bolts 56. A peripheral sealant bead 57 ensures the interface and the aerodynamic continuity between both structures.

In order to allow slight sliding of the structures relatively to each other, the rivets 56 are mounted with slight play 58. Moreover, the selection of the rivet 56 will be such that its installation tension is limited and in the case of a significant load allows relative sliding of both structures.

Figure 4:

According to a second form, schematically illustrated in FIG. 4, the aerostructure 51 is bound to the wall of the air intake section 3 via a buckling area 60, which may be integrated to either one or the other or both structures, this buckling area 60 corresponding to a section with a small thickness capable of buckling under loads notably corresponding to a blade loss accident 19, but resistant to normal flight loads.

In order to ensure delimitation of the buckling section 60, the latter may be surrounded with stiffeners 61, notably belonging to the aerostructure 51 and/or to the wall of the air intake section 3.

Figure 5:
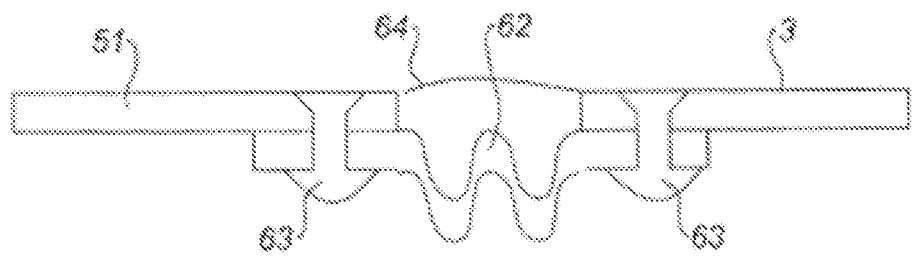

According to a third form, schematically illustrated in FIG. 5, the aerostructure 51 is bound to the wall of the air intake section 3 via a flexible connection 62, itself bound to each structure by rivets 63.

An external peripheral bead 64 will ensure the aerodynamic continuity and the seal between both structures.

This flexible connection will be designed so as not to damp the loads and not transmit any significant substantial loads. This connecting part may be made from synthetic rubber (silicone for example) reinforced with glass fibers (or any equivalent fiber).

Figure 6:
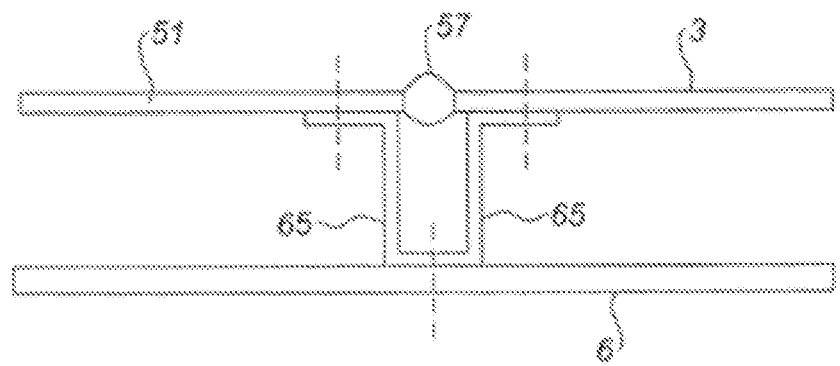

According to a fourth form, schematically illustrated in FIG. 6, the aerostructure 51 is bound to the wall of the air intake section 3 via stiffeners 57 with a right-angled shape also bound to the case 6.

Thus, the loads transmitted by the air intake section 3/aerostructures 51 interface, are mainly spread out by the case 6 and not transmitted to the other structure.

Although the invention has been described with particular exemplary embodiments, it is quite obvious that it is by no means limited thereto and that it comprises all the technical equivalents of the means described as well as their combinations if the latter enter the scope of the invention.

What is claimed is:

1. A nacelle for a turbojet engine, comprising:
   an upstream section forming an air intake;
   a middle section surrounding a fan of the turbojet engine and its case; and
   a downstream section,
   the middle section being made from at least one aerostructure configured to provide external aerodynamic continuity of the nacelle, wherein said aerostructure is rigidly bound, in a manner that prevents opening of the aerostructure by pivoting around its upper edge, to at least one of said upstream section and said downstream section,
   wherein said aerostructure is rigidly connected, so as to be able to be taken apart, to a pylon or an interface for connecting the nacelle to the pylon.

2. The nacelle according to claim 1, wherein the aerostructure comprises at least one hatch allowing access to an inside of the nacelle located in proximity to at least one of an upper twelve o'clock, a lower so-six o'clock, and a middle area.

3. The nacelle according to claim 1, further comprising two aerostructures, substantially hemicylindrical, positioned on either side of a substantially longitudinal axis of the nacelle.

4. The nacelle according to claim 1, wherein the aerostructure is rigidly bound, so as to be able to be taken apart, to a lower longitudinal beam.

5. The nacelle according to claim 1, wherein the aerostructure is bound to another aerostructure in a lower portion.

6. The nacelle according to claim 1, wherein the downstream section is equipped with a thrust reversal device.

7. A nacelle for a turbojet engine, comprising:
   an upstream section forming air intake;
   a middle section surrounding a fan of the turbojet engine and its case; and
   a downstream section,
   the middle section being made from at least one aerostructure configured to provide external aerodynamic continuity of the nacelle, wherein said aerostructure is rigidly bound, so as to be taken apart, to at least one of said upstream section and said downstream section, wherein the aerostructure is bound to a corresponding wall of the air intake,
   wherein the interface between the aerostructure and the air intake has at least one local buckling area capable of withstanding normal loads in flight and buckling in a case of overloads due to a blade loss.

8. The nacelle according to claim 7, wherein the aerostructure is bound to the air intake wall by means of one of rivets or screws and mounted with play between both structures.

9. The nacelle according to claim 7, wherein the buckling area is associated with at least one stiffener surrounding the buckling area.

10. The nacelle according to claim 7, wherein the buckling area is associated with two stiffeners surrounding the buckling area.

11. The nacelle according to claim 7, wherein the aerostructure is bound to the air intake wall via a flexible connection capable of damping the transmissions of forces so as to reduce transmission of loads.

12. The nacelle according to claim 7, wherein the connection between the aerostructure and the air intake wall is achieved via a fan case by means at least one stiffener.

* * * * *